(12) United States Patent
Jüstel

(10) Patent No.: US 11,584,523 B2
(45) Date of Patent: Feb. 21, 2023

(54) FLIGHT SYSTEM

(71) Applicant: Peter Jüstel, Niedernhausen (DE)

(72) Inventor: Peter Jüstel, Niedernhausen (DE)

( * ) Notice: Subject to any disclaimer, the term of this patent is extended or adjusted under 35 U.S.C. 154(b) by 0 days.

(21) Appl. No.: 16/980,837

(22) PCT Filed: Apr. 8, 2019

(86) PCT No.: PCT/DE2019/000101
§ 371 (c)(1),
(2) Date: Sep. 14, 2020

(87) PCT Pub. No.: WO2019/192636
PCT Pub. Date: Oct. 10, 2019

(65) Prior Publication Data
US 2021/0354817 A1    Nov. 18, 2021

(30) Foreign Application Priority Data

Apr. 6, 2018  (DE) .......................... 102018002782.2

(51) Int. Cl.
| | |
|---|---|
| *B64C 33/02* | (2006.01) |
| *B64C 39/02* | (2006.01) |
| *B64C 9/00* | (2006.01) |
| *B64C 13/04* | (2006.01) |
| *B64C 31/04* | (2006.01) |
| *B64D 27/16* | (2006.01) |
| *B64D 43/00* | (2006.01) |
| *G06F 3/14* | (2006.01) |

(52) U.S. Cl.
CPC .............. *B64C 33/025* (2013.01); *B64C 9/00* (2013.01); *B64C 13/04* (2013.01); *B64C 31/04* (2013.01); *B64C 39/026* (2013.01); *B64D 27/16* (2013.01); *B64D 43/00* (2013.01); *G06F 3/14* (2013.01)

(58) Field of Classification Search
CPC ......... B64C 33/025; B64C 9/00; B64C 13/04; B64C 31/04; B64C 39/026; B64C 33/02; B64D 27/16; B64D 43/00; G06F 3/14
See application file for complete search history.

(56) References Cited

U.S. PATENT DOCUMENTS

| | | | | |
|---|---|---|---|---|
| 4,749,149 | A * | 6/1988 | Gruich .................... | B64C 33/02 244/22 |
| 5,915,650 | A * | 6/1999 | Petrovich ................. | B64C 3/38 244/46 |
| 11,104,413 | B2 * | 8/2021 | Wubu ....................... | B64C 3/56 |
| 2003/0197090 | A1 * | 10/2003 | Klima ..................... | B64D 17/00 244/4 A |
| 2015/0210389 | A1 * | 7/2015 | Murdock ................ | B64C 33/02 244/22 |

\* cited by examiner

*Primary Examiner* — Rodney A Bonnette
(74) *Attorney, Agent, or Firm* — Intelink Law Group PC; Brad Bertoglio

(57) ABSTRACT

The invention relates to a flight system having at least two actuated flapping wings (2), an actuated tail unit (9), a control device and an exoskeleton (1) for at least one person. The exoskeleton (1) is movable independently of the flapping wings (2). The control device is configured to receive motion sensor signals from the exoskeleton (1) and to use the motion sensor signals to define specified movement signals and to control the flapping wings (2) and/or the tail unit (9) by way of the specified movement signals. The specified movement signals can be defined such that the movements of the flapping wings (2) and/or of the tail unit (9) follow those of the exoskeleton (1).

18 Claims, 5 Drawing Sheets

FLIGHT SYSTEM

1. FIELD OF THE INVENTION

The present invention relates to a flight system with actuated flapping wings and an actuated tail unit.

2. RELATED ART

DE-PS 652 170 discloses a swing glider that can be driven by muscle power, in which primaries/secondaries moved by muscle power are connected to the fuselage by rubber ropes, whereby the forces of the flier are to be supported, wherein the primaries/secondaries can be locked by means of manually switchable pawls and the aircraft can continue to be used as a glider without any effort.

DE-PS 173 926 discloses a flying machine with flapping wings, which can be actuated via a frame rack by the arms of the pilot with the arm bent, the elbows each resting in an abutment and the hands each engaging a curved handle, the different areas of engagement of which allow different lever arms to drive the wings.

A hover glider with motor-assisted secondaries is known from WO 2014/028083 A2. The secondaries can be operated and controlled using hand claws or cardan rings which are arranged on an inner wing spar section. A fan-shaped rudder can be operated with the foot.

None of the theoretically conceived flapping wing systems could so far be brought to practical use. Alternatively, hang gliders and paragliders and ultra-light flight systems have become more widespread. However, hang gliders/paragliders cannot climb on their own; instead, they depend on the use of updrafts or thermal lift to gain height, and resemble gliders in this respect, but have significantly lower glide ratios. On the other hand, the glider, with which considerable distances can be covered while gliding, lacks the dynamism and the immediate experience that is characteristic of the hang gliders and paragliders. Ultra-light flight systems use a propeller for propulsion and can be designed as a motorized hang glider/paraglider or have a cabin and fixed wings.

SUMMARY

An object of the present invention is to provide a practical flight system with flapping wings. The flight system should also enable ergonomic, safe and fatigue-free flying.

The present invention describes a flight system comprising actuated or actuatable flapping wings and an actuated or actuatable tail unit, which can be controlled by a pilot. The flight system comprises at least two actuated flapping wings, an actuated tail unit, a control device, and an exoskeleton for at least one person. The exoskeleton being movable independently of the flapping wings and the control device is configured to receive motion sensor signals from the exoskeleton, use the motion sensor signals to define specified movement signals, and control the flapping wings and/or the tail unit by way of the specified movement signals. The specified movement signals are defined such that the movements of the flapping wings and/or of the tail unit follow those of the exoskeleton, where ratios of controller input variables received on the exoskeleton, the flapping wings, the tail unit and subsystems can be set to resulting controller output variables, the controller input variables and controller output variable can also be completely decoupled, and one or more measured variables are combined to form a manipulated variable. In the embodiment according to the invention, the pilot uses an exoskeleton for this purpose, which is functionally coupled to the wings and tail unit, but is movable independently thereof. The functional coupling is achieved by the control device, which controls the movements of the flapping wings and/or the tail unit based on the movements of the exoskeleton. As an example, the control device can also control feedback to the exoskeleton on the basis of the effects such as forces, accelerations, and speeds prevailing on the flapping wings and/or the tail unit. As another example, the degrees of freedom of the flapping wings can be associated with the arms and/or hands of the pilot and the degrees of freedom of the tail unit can be associated with the legs and/or feet of the pilot.

The flapping wings can be externally similar to those of birds or bats. This means that they can have a movable, load-bearing structure and a suitable, aerodynamically designed surface in addition to sensors and actuators. As an example, the flapping wings can have several mutually movable and actuated wing elements, and wherein stretchable material and/or overlapping spatial surfaces are preferably provided at boundaries between two wing elements and/or between one wing element and one device carrier. A central structure forms the device carrier to which the flapping wings or their respective first wing elements and/or the tail unit are hinged. The device carrier can, for example, have the shape of a backpack to be carried by the pilot. The device carrier can also accommodate subsystems of the flight system such as energy storage systems and converters, control devices, interfaces, valves, sensors, lines, auxiliary units, etc.

The tail unit can also be designed externally comparably to the tail feathers of the birds or have such tail feathers. However, other configurations, such as in the form of a conventional aircraft tail unit, are also conceivable.

In the context of the invention, the exoskeleton is a system which is able to measure forces and movements of the body located in it and, in turn, exert forces on the body. Its actuated degrees of freedom can therefore be utilized as a control element with force feedback.

The invention describes a combination of actuated wings/tail unit and an exoskeleton with the inclusion of a flight controller or a control device: State variables such as, e.g., forces and positions of the limbs and their joints, which can generally be referred to as motion sensor signals, are received via the exoskeleton in order to serve as controller input variables. The control device then uses an algorithm to process these variables into controller output variables, which are used as set point signals for the movements of the wing and tail unit system in the form of specified movement signals. In return, state variables of the wing system can be sensed in the form of movement effect signals, which serve as controller input variables for the exoskeleton system. The control device uses it to generate set point signals for the exoskeleton actuators in the form of feedback specification signals. A new type of flight system is created, which can also use the concepts from telepresence and telerobotics. With this system the pilot can control the wings and thus the flight, as well as "feel" the flight attitude. As a consequence, the pilot will probably be able to learn to fly intuitively. In the preferred case, the exoskeleton and wing system are physically connected to one another, but can also be located in physically separate locations, as is usual in telerobotics. However, since the exoskeleton and the flapping wings/tail unit can move independently of one another, i.e., are mechanically decoupled, the pilot can always adopt a comfortable posture or one in which his movements are optimized. In addition, a force translation of the movements of the pilot into movements of the flapping wings/the tail unit and a feedback to the pilot can be adapted to the actual physical strength of the pilot.

It is to be understood that in addition to the components mentioned, subsystems can or must also be present, such as an energy source (battery, turbine, etc.), energy converter (hydraulic motors, compressors, and the like), distribution system, etc. The exoskeleton can be physically separable from the flapping wings so that, e.g., the flapping wings can be controlled remotely, or can be dropped in the air in an emergency.

The main wings or flapping wings should be controllable with the arms and hands. The tail feathers or the tail unit should be controllable with the legs or the feet. In addition, each coupling can be deactivated individually ad hoc.

The wings and the tail unit could also be controlled differently than by the exoskeleton, or the wings need not be controlled exclusively via the exoskeleton. As an example, a further input means can be provided in order to specify movements of flapping wings and/or tail unit, the further input device in particular having analog sticks, switches and buttons and/or a brain computer interface. A controller very similar to a game controller would be conceivable, for example. For example, it would have two analog sticks that could be used to control back and forth as well as nod and roll. It could also have a button to cause a wing flap. You could then fly similar to Flappy Bird. Brain-computer interfaces are also under development. If the movements of flapping wings and/or tail unit are not or not only specified by an exoskeleton, but are entered with another input method, such as analog sticks, switches and buttons and/or a brain-computer interface, the specified movements for the system components can also be calculated automatically on the basis of a direction of movement or a predetermined movement pattern for the overall system.

The special mechanism of the primaries can also be observed in birds. If birds take off vertically, they generate thrust with the secondaries even during upstroke. For this purpose, a wing tip or the individual secondary is flapped/flipped backwards/upwards, and the air is thereby pushed away or accelerated backwards and downwards.

With a setting of the ratios of controller input variables and controller output variables, the strength of the feedback force can also be set, and the angular speeds of the arms and wings do not always have to be the same. In addition, the movements of the exoskeleton and wings can be decoupled so that you have "your hands free". Simplifications may also be possible, e.g., by combining some degrees of freedom so that only one has to be controlled. That is, the set point and control variable do not have to have a direct relationship to one another.

The gyroscopes provided can generate moments in addition to the air forces. This will likely allow the pilot to perform other maneuvers. It could also be useful for flight control.

An emergency configuration as provided can make the flight system safer against technical problems or physical and/or mental breakdown of the pilot. For this purpose, for example, preloaded energy storage systems can be connected to the actuators of the flight system, or airbags, retrorockets, ballistic parachutes or the like can be used.

Additional drive elements, as provided can be used, for example, for high-speed flight or for the pilot's recovery.

DETAILED DESCRIPTION

Figure 3:
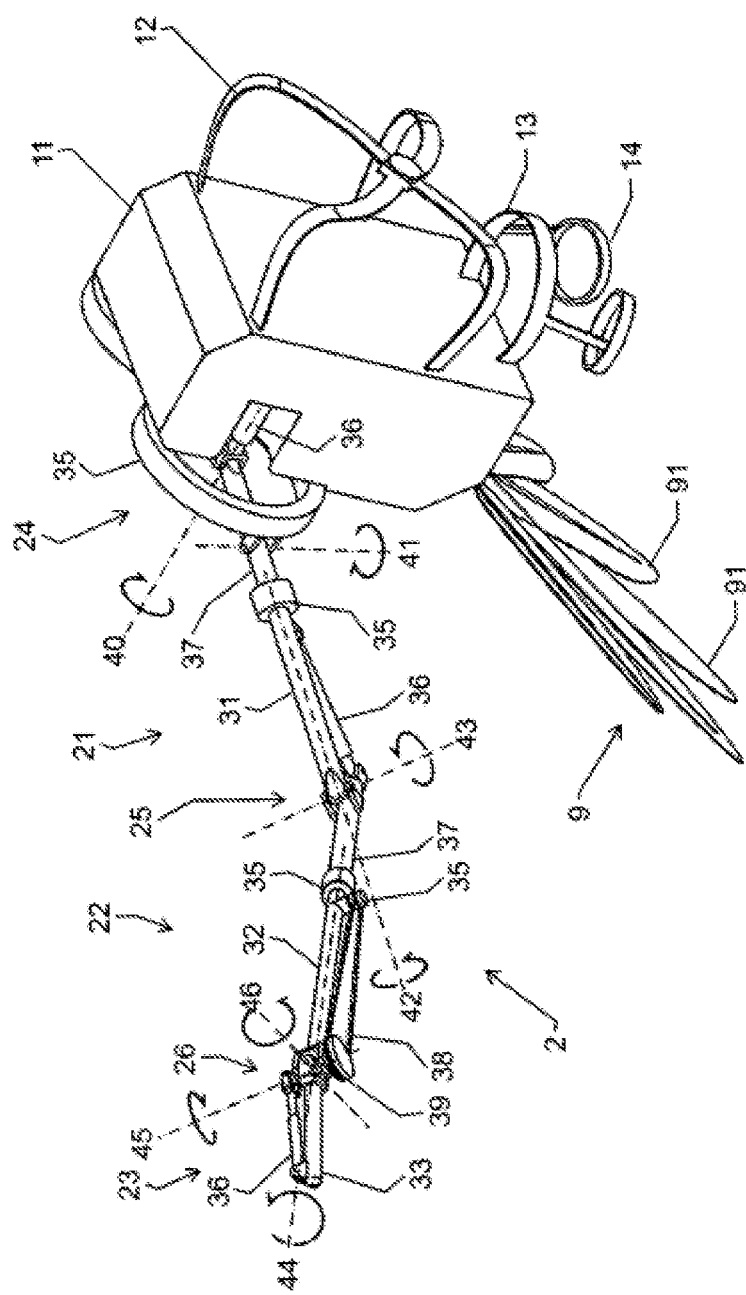
FIG. 3 shows a section of a skeletal structure of the flight system of FIG. 2.
Figure 4:
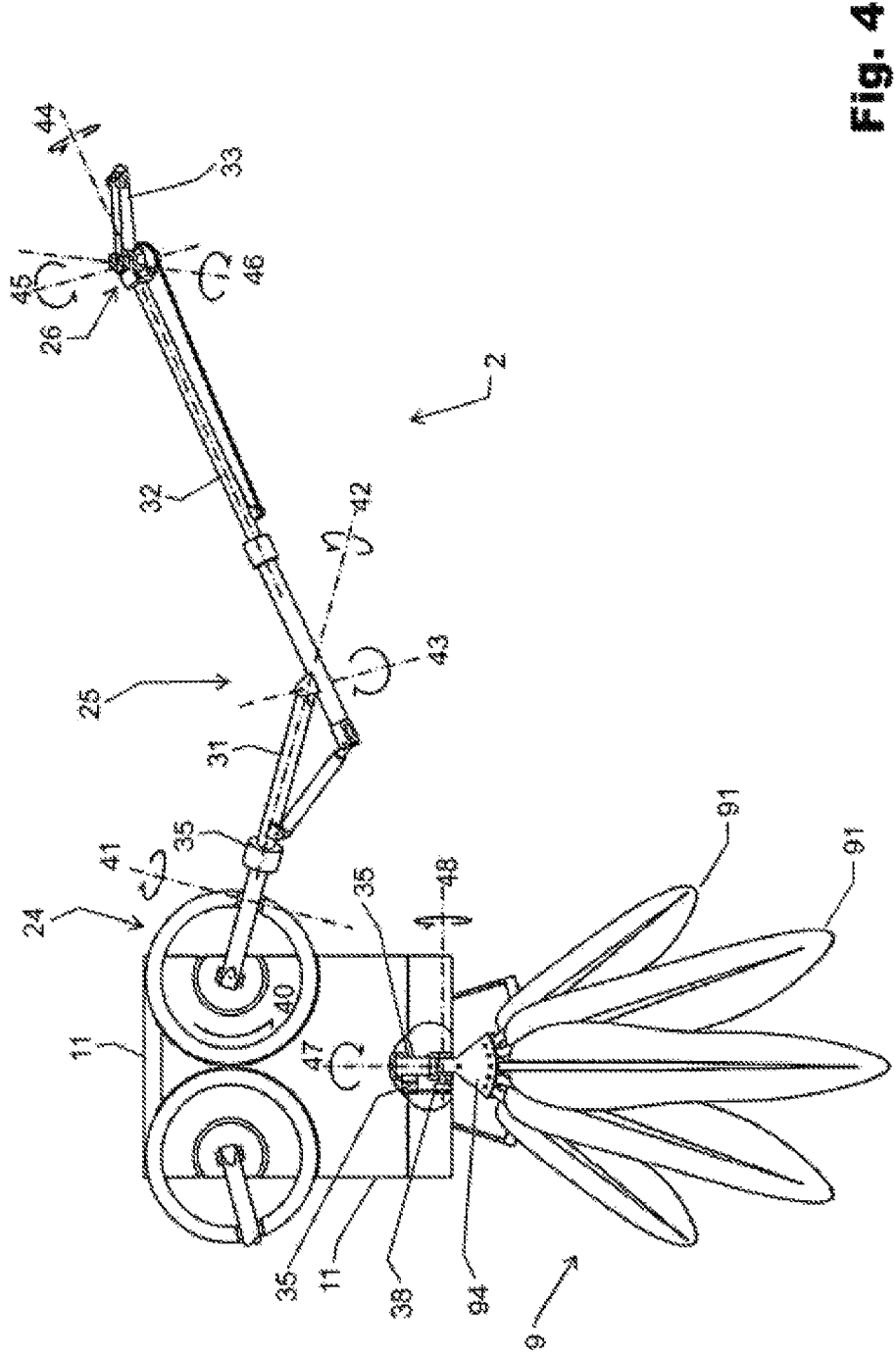
FIG. 4 shows a rear view of the section from FIG. 3.
Figure 5:
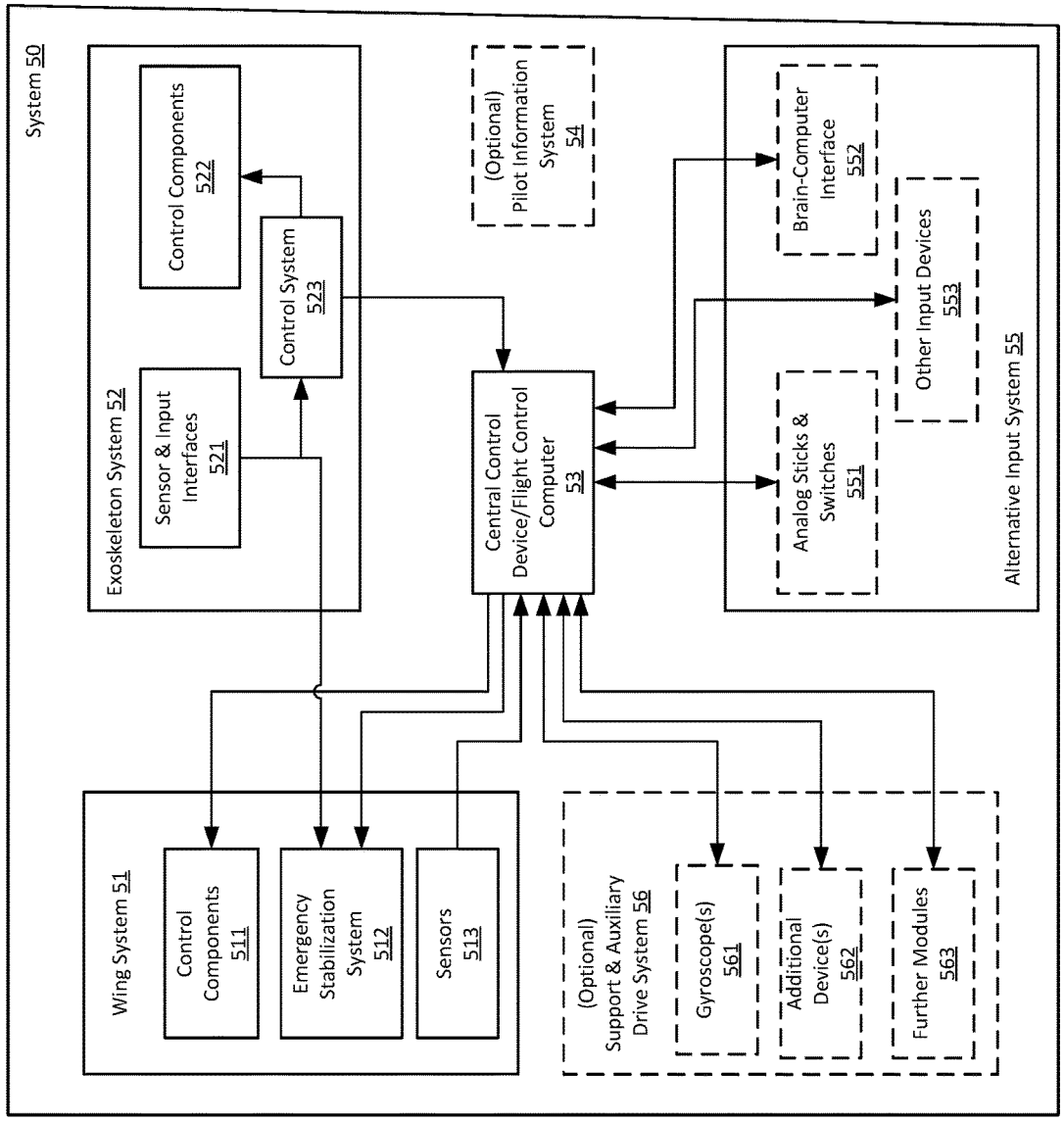
FIG. 5 shows a block diagram of a flight system according to an exemplary embodiment of the present invention.

A preferred, non-exclusive exemplary embodiment of the patent content is described below. In FIGS. 1 to 4, the preferred exemplary embodiment is shown schematically. Connecting elements, sensors, lines and other details are not shown. In FIGS. 3 and 4, for the sake of clarity, the representation is reduced to the skeleton structure and the preferred design of the mechanics of the wings. FIG. 5 shows a possible block diagram of the individual systems in the overall system.

Figure 1:
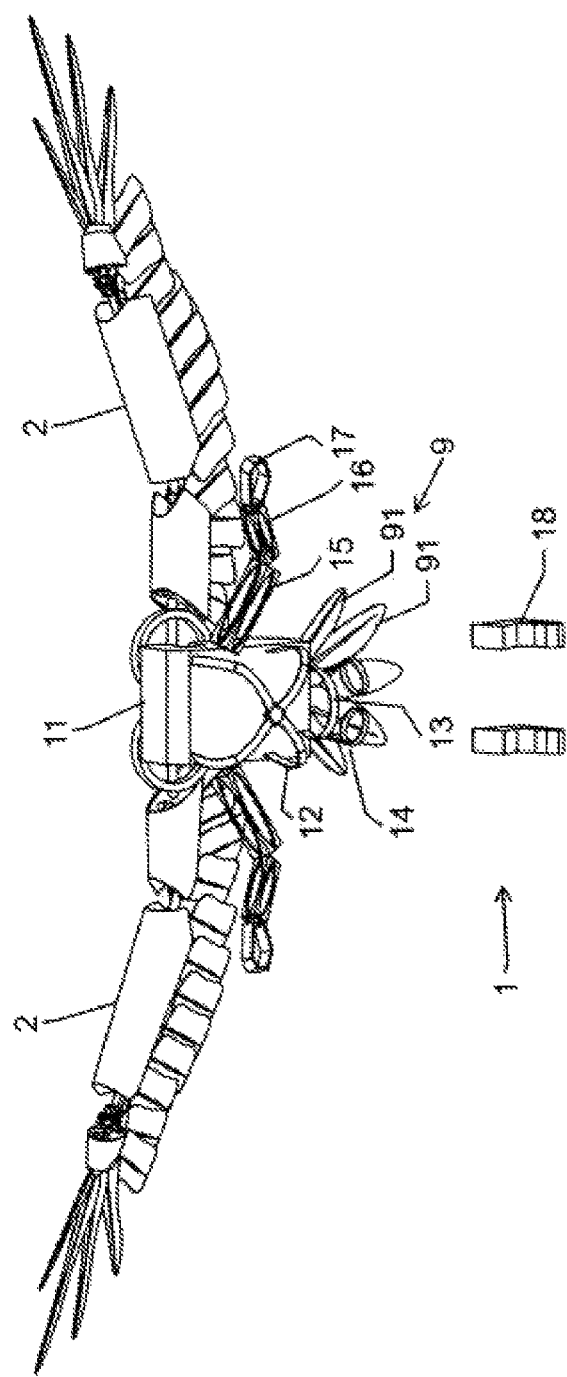
FIG. 1 shows a front view of a flight system according to an exemplary embodiment of the present invention.

The flight system of this exemplary embodiment has an exoskeleton 1, a flapping wing arrangement with two flapping wings 2 and a tail unit 9 (FIG. 1).

The exoskeleton 1 has a device backpack 11, a chest strap 12, a waist strap 13, a thigh cuff 14 for each thigh of a pilot (not shown here), furthermore an upper arm cuff 15, a forearm cuff 16 and a glove 17 for each arm of the pilot, and a boot 18 for each foot of the pilot. The chest strap 12 and the waist strap 13 are attached to the device backpack 11 and are configured to accommodate the chest and abdomen of the pilot. The thigh cuffs 14 are hinged to the device backpack 11 and are configured to accommodate the thighs of the pilot. The upper arm cuffs 15 are hinged to the device backpack 11 and are configured to accommodate the upper arms of the pilot. The forearm cuffs 16 are hinged to the respective upper arm cuff 15 and are configured to accommodate the forearms of the pilot. The gloves 17 are hinged to the respective forearm cuff 16 and are configured to accommodate the hands or just the palms of the pilot. The boots 18 are hinged to the respective thigh cuff 14 and are configured to accommodate the lower legs and/or the feet of the pilot. The joints between the device backpack 11 and each thigh cuff 14, between the device backpack 11 and each upper arm cuff 15, between the upper arm cuffs 15 and the respective forearm cuff 16, between the forearm cuffs 16 and the respective gloves 17, between the thigh cuffs 14 and the respective boots 18 and, optionally, within the boots 18 between the shaft and foot part and/or within the gloves 17 at the finger joints, are equipped with sensors (not shown in detail or 521 in FIG. 5) which detect the respective joint position with respect to at least one axis, and are also equipped with actuators (not shown in detail or 522 in FIG. 5), which are configured to represent a reaction force on the respective joint axes. The sensors and actuators of the exoskeleton are signal-connected to a control device (not shown in detail or 53 in FIG. 5), which is accommodated in the device backpack 11, and can also be supplied with energy by the control device 53, provided that they do not have their own energy source. Signal transmission can be wired or wireless. Joint positions can also be sensed with conventional sensors or in a contactless manner by detecting the relative positions of different transmitting and receiving points on the exoskeleton 11 with respect to one another.

The uplift of the overall system is mainly generated by the flapping wings 2. They consist of at least two, but in the preferred embodiment of three sections or wing elements which are articulated together. The attitude control of the flight system also takes place via the tail unit 9, which has several tail feathers 91.

Figure 2:
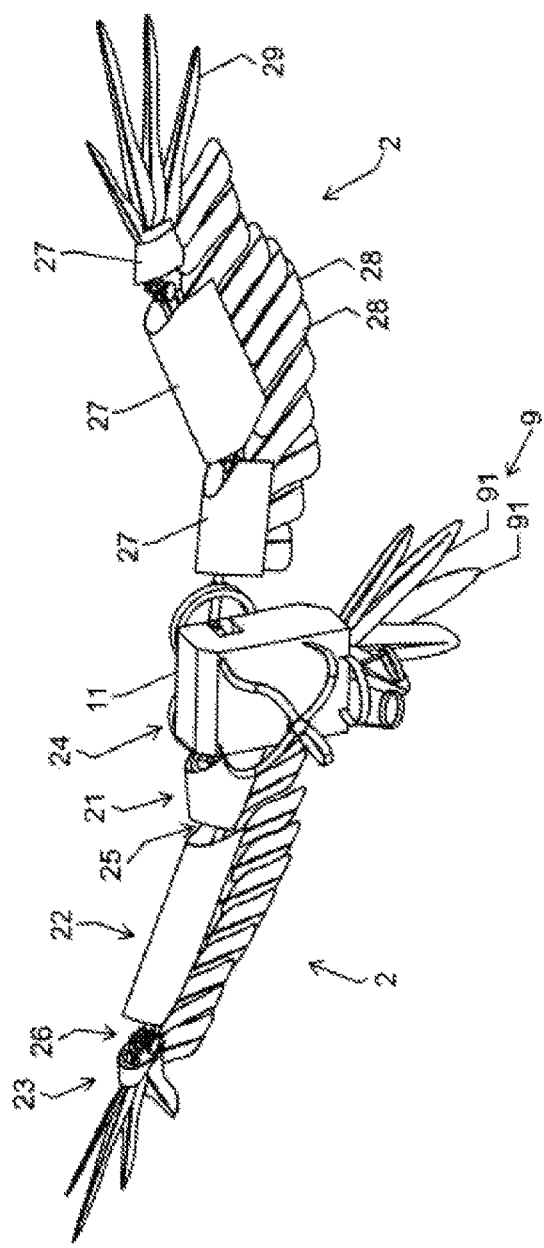
FIG. 2 shows a perspective front view of part of the flight system of FIG. 1.

The flapping wings 2 and the tail unit 9 are also attached or hinged to the device backpack 11 (FIG. 2). The individual components of the flapping wings 2 are designated below, insofar evident, based on their anatomical model on the bird wing. Each flapping wing 2 has an upper arm section 21 as a first wing element, a forearm section 22 as a second wing element, and a hand section 23 as a third wing element. A shoulder joint 24 connects the upper arm section 12 to the device backpack 11. An elbow joint 25 connects the upper arm section 12 to the forearm section 22. A wrist 26 connects the forearm section 22 to the hand section 23. The upper arm section 21, the forearm section 22 and the hand section 23 each have a fairing 27 which each form at least one leading edge. In the rear area of the sections 21, 22, 23 in the direction of flow, several secondaries 28 are provided. The secondaries 28 can be fixed to the respective sections 21, 22, 23 in a rigid manner or at least partially movable about one, two or three axes (in and/or perpendicular to the wing plane and/or about the spring axis). At the distal end of the hand sections 23, several primaries 29 are provided. The primaries 29, like the secondaries 28, can be attached to the hand section 23 so as to be movable about one, two or three axes or can at least in part also be rigidly attached. The fairing 27 and secondaries 28 form aerodynamically effective airfoils. The surfaces (fairing 27, primaries/secondaries 28, 29) are designed and supported in such a way that the degree of freedom of the wing hinges is not impaired. Although not shown in detail here, elastic fairings can be provided in the area of the joints 24, 25, 26 in order to avoid gaps between the fairings 27, where turbulence could occur, or the fairings 27 can each be configured, for example, interlockingly and/or elastically connected in sections, so that no or only a very small gap arises between the fairings 27 in each joint position of the joints 24, 25, 26. In an embodiment variant of a bat-like wing, the entire wing surface can be made of stretchable material.

Optionally, small springs or spring-like elements can also be provided, which lie in the direction of the flow on the surface of the wings. If the flow breaks, it is known that the flow direction is reversed in the boundary layer. In this case, the small springs stand up due to the flow, which hinders or even prevents the backflow. This mechanism can be useful for the unsteady flow processes on the flapping wing.

The skeletal structure of the flapping wings 2 will now be described in more detail. FIG. 3 corresponds to FIG. 2 from a different perspective, with a flapping wing 2, fairing 27 and primaries/secondaries 28, 29 of the illustrated flapping wing 2 and parts of the exoskeleton 1 being omitted to illustrate internal structures. FIG. 4 corresponds to FIG. 3 from the rear. Based on their biological model, the skeletal parts of the upper arm section 21, the forearm section 22 and the hand section 23 are referred to below as humerus 31, ulna 32 and digitus 33. (There is no radius because forearm torsion is implemented differently from a technical perspective.) In the context of this description, terms such as proximal, distal etc. relate to the direction or position in relation to the device backpack 11 or its center.

The joints 24, 25, 26 are implemented and actuatable by rotary actuators 35, linear actuators 36, levers 37 and belt drives 38 with rotary wheels 39.

In particular, the shoulder joint 24 is constructed as follows: A rotary actuator 35 rotates a ring mounted on the device backpack 11 about an axis 40. A lever 37 is mounted on the ring, the (proximal) end of said lever which is located in the interior of the ring is moved linearly along the axis 40, i.e., from and to the device backpack 11, by a linear actuator 36, which is also mounted on the device backpack 11. As a result, the lever 37 can pivot about an axis 41 in the bearing point on the ring. It is to be understood that the lever 37 with the ring can also pivot about the axis 40. The (distal) end of the lever 37 located outside the ring carries a further rotary actuator 35, the movable part of which engages the humerus 31 and rotates it relative to the lever 37 about its axis 42. The humerus 31 can extend further proximally inside the lever 37 and be mounted there at least radially, which reduces bending moments in the rotary actuator 35 or in the lever 37. Apparently, in analogy to a wing configuration of a bird or aircraft, an angular position about the axis 40 defines a sweep angle, an angular position about the axis 41 defines a flapping angle and an angular position about the axis 42 defines an angle of attack of the flapping wing 2.

The elbow joint 25 has a lever 37 which is mounted on the outer (distal) end of the humerus 31 so as to be pivotable about an axis 43. A linear actuator 36 engages the humerus 31 and the proximal end of the lever 37 and thus pivots it about the axis 43. A further rotary actuator 35 is provided at the distal end of the lever 37, the movable part of which engages the ulna 32 and rotates the ulna 32 about its axis 44 with respect to the lever 37. The ulna 32 can extend further proximally in the interior of the lever 37 and be mounted there at least radially, which reduces bending moments in the rotary actuator 35 or in the lever 37. Obviously, in analogy to biological conditions, an angular position about the axis 43 defines a flexion angle of the elbow joint 25 and an angular position about the axis 44 defines a forearm torsion angle.

The wrist joint 26 is constructed as follows: A universal joint with two axes 45, 46 is attached to the distal end of the ulna 32 and merges into the digitus 33 in the distal direction. The axis 45 mounted on the side of the ulna 32 also carries a wheel 39 which is driven via a belt 38 with a rotary actuator 35 that is attached to the ulna 32. A linear actuator 36 engages on the one hand on the axis 45 and pivots with it, and on the other hand engages the digitus 33 in order to pivot it about the axis 46. Obviously, again in analogy to biological conditions, an angular position about the axis 45 defines an abduction angle and an angular position about the axis 46 defines a flexion angle of the wrist 26.

The humerus 31 thus has 3 degrees of freedom of rotation, which effectively allow the wings to flap (41), pivot or rapidly move (40), and adjust or rotate (42). The ulna 32 has two degrees of freedom with which the flapping wings 2 can be folded (43) and crossed (44). The digitus 33 can also fold (46) and also hang (45). The axis 45 is an axis which is perpendicular to the folding axis 46 and the longitudinal axis of the digitus.

In the preferred exemplary embodiment, the tail unit 9 is also modeled on the birds. Multiple tail feathers 91 are fixed to an articulated base 94 like a fan. The base 94 has two degrees of freedom: rotating about the bisector 47 of the fan by means of a rotary actuator 35, and tilting about a transverse axis 48 running through the base of the base 94 by means of a further rotary actuator 35 and belt drive 38. Optionally, the individual tail feathers 91 can also be twistable about their own axis and/or pivotable with respect to the base 94. The actuators and sensors are comparable to those of the flapping wings 2.

Relative movements between the individual members 21, 22, 23, 94 or with respect to the device backpack 11 are brought about directly or indirectly by the named regulators or actuators. Actuators are understood to mean working components. Examples are electric motors, pneumatic or hydraulic cylinders. In the present exemplary embodiment, these are primarily hydraulic linear cylinders (linear actuator 36) and hydraulic rotary cylinders (rotary actuator 35). As described, other elements for power transmission and conversion can also be used, such as a belt drive 38, 39.

Positions, forces and other relevant variables are sensed with various sensors. These are, for example, load cells, strain gauges, position sensors, thermometers, pressure cells, etc.

If individual primaries/secondaries 28, 29 or tail feathers 91 can be actuated individually, further corresponding actuators and optionally sensors must be provided.

In the present exemplary embodiment, the exoskeleton 1 has a fixed structure 11-13 for the torso and a movable structure 14-18 for the arms and for the feet and/or legs of the pilot. In FIG. 1, the exoskeleton 11 is shown only symbolically as an arm and foot outline. It is to be understood that the arrangement shown is purely exemplary and can be modified as desired within the scope of the functionality presented here. For example, the device backpack stands for any form of device carrier to which the flapping wings 2 and the tail unit 9 can be hinged. Furthermore, instead of the chest harness 12 and waist strap 13, a harness or a vest can be provided to which the upper arm cuffs 15 and the thigh cuffs 14 are hinged. The device backpack 11 can be configured separately and can be mountable on the harness or the vest. A back section can be provided to which the chest harness 12, waist strap 13 and cuffs 14, 15 are attached or hinged and to which a device carrier can be attached. A full-body suit can also be provided as exoskeleton 1, which integrates the functions of chest harness 12, waist strap 13, cuffs 14-16, gloves 17 and boots 18 as well as all the joints in between. In the latter case, for example, the device backpack 11 with the flapping wings 2 and the tail unit 9 can be pulled over the full-body suit. All conceivable combinations of the above-mentioned modifications are possible as required and intended for use.

For a further understanding, the flight system will now be described from a system perspective with reference to the block diagram in FIG. 5. The flight system or overall system 50 has a wing system 51, an exoskeleton system 52 and a central control device 53, which can also be referred to as a flight control computer. Optionally, a pilot information interface 54, an alternative input system 55 and a support and auxiliary drive system 56 can be provided. The wing system 51 has control components 511 of the flight actuators 35, 36 (FIGS. 3, 4), an emergency stabilization system 512 and a plurality of sensors 513. The exoskeleton system 52 has sensors and input interfaces 521 for the individual limbs or joints of the exoskeleton 1 (FIG. 1), control components 522 of feedback actuators of the exoskeleton 1 and a control system 523. The optional alternative input system 55 can, for example, have analog sticks and switches 551, a brain-computer interface 552 or other input devices 553. The optional support and auxiliary drive system 56 can, for example, have one or more gyroscopes 561, one or more additional drives 562 or further modules 563. The control device 53 can also be treated as part of the wing system 51. Likewise, the support and auxiliary drive system 56 can also be treated as part of the wing system 51. The control system 523 of the exoskeleton system 52 can also be fully or partially integrated in the control device 53. The control device 53 can also be implemented in a distributed manner in other systems. In the present exemplary embodiment, the control device 53 with valves, etc. is physically housed in the device backpack 11, which thus serves as a device carrier.

All seven actuated degrees of freedom 40-46 of the flapping wings 2 are to be controlled by the arms in this exemplary embodiment, which is why, for example, seven sensed degrees of freedom on the arms are also used as controller input variables for the central control device 53 to control the flapping wings 2. More or fewer degrees of freedom can also be sensed on the arms, which are converted into the actuated degrees of freedom of the flapping wings. The (at least) two degrees of freedom of the tail feathers 91 are to be controlled with the ankle joints and/or knees. The inclination of the fan about the transverse axis 48 can, for example, be controlled by the mean angle of the two joints, while the rotation of the fan about the longitudinal axis 47 can be controlled by the angle difference between the two joints. Rotating the trunk or bending a hip can be used for position control, for example a roll control, wherein the roll can be initiated, for example, via an angle of attack of the flapping wings 2. The actuated degrees of freedom can be regulated, for example, in a manner known per se by means of impedance or admittance regulation.

In addition to exoskeleton 1, another input method can optionally be used for the controller input variables. It is conceivable to abstract the movements of the wings 2 in the form of motion patterns. These patterns could be retrieved and controlled with switches, buttons and/or analog sticks. It would be conceivable to trigger the flap of the wing at the push of a button and to control the forward, sideways and rolling movements of the entire system with analog sticks. In such a case, the stabilization of the flight attitude could be taken over completely automatically by the flight control system. An autopilot function or an emergency takeover function could also be implemented in this way.

The control device or flight controller 53 controls the entire wing system 51 and can also control the support and auxiliary drive system 56. It records the states and measured variables of the wing system 51, as well as the signals of the input methods 521 of the exoskeleton system 52 and, optionally, of the alternative input system 55. They are processed using common methods and then output via the interface 54 as manipulated variables for the actuators of the wing system 51, as input variables for the exoskeleton controller 523 and as information for the pilot. An overview of the information flows can be seen in FIG. 5. Control systems of this type are known per se in many different applications and variations, and are often present in a quadruplex design in aircraft. A four-channel bilateral telemanipulation system, for example, can be used to link the exoskeleton and the wings.

All of the aforementioned subsystems are connected to the device backpack 11. It represents the central structure between flapping wings 2, tail unit 9 and pilot or exoskeleton 1. The device backpack 11 was described above as the exoskeleton 1 or belonging to the exoskeletal system 52. However, this belonging is not mandatory. The device backpack 11 can also be regarded as belonging to the wing system 51, wherein only a back section or structure of the device backpack 11, to which the upper arm and thigh cuffs 15, 14 are hinged, can be regarded to belong to the exoskeleton system 52.

The device backpack 11 contains all other units and means that are required for operation and are not attached to any other structure. These are, for example, energy storage systems such as batteries, pressure vessels and fuel tanks as well as energy converters such as electric motors, shaft power drives, combustion engines and hydraulic pumps. It also contains the control device 53, switches and valves for the actuators of the wing system 51, and possibly gyroscopes. Other auxiliary systems common in aviation, such as fire extinguishing systems, are also conceivable. In the preferred embodiment, it also includes controls, switches and valves, etc., for supplying and regulating the exoskeletal system 52. The pilot is preferably attached to it via the harness 12, 13, similar to those of parachutists. The upper arm cuffs 15 and thigh cuffs 14 are movably attached to it. In an embodiment variant, the exoskeleton 1 does not require any structural fastening around the feet/knees. In this case, only the connections required for the actuators and sensors lead to it.

In the event that the flight should get out of control, the emergency system 512 is provided. In this way, for example, the flapping wings 2 and the tail unit 9 are brought into a stable configuration if the exoskeleton 1 fails to operate. In cylinder/piston actuators 35, 36 this can be a preloaded and locked spring. If the lock is released, it moves the wing in such a way that the entire system can go into gliding flight or, for example, adopts a configuration similar to dandelion seeds, which limits the rate of descent. A pressurized gas container with a manual valve, with which the pistons can be moved manually, would also be conceivable. A ballistically ejected parachute, which is also effective at low altitudes, could also be used. It is also conceivable that the unit of exoskeleton 1 and pilot can be separated from the wing system and has a separate parachute. To get to the emergency configuration, the emergency system can be activated, for example, by the flight control or directly by the pilot.

For navigation and other purposes, the interface 54 can be provided to the flight control, which passes on various information such as, e.g., flight attitude and speed, amount of fuel, altitude, etc. These can be used by instruments, a Head-Up-Display (HUD) or Head-Mounted-Di splay (HMD) system and other modules.

It is conceivable to attach additional drive systems to the wing system. It would be possible, for example, to attach jet propulsion systems to the device backpack 11, or to attach propellers together with the drive to the wings 2 or the device backpack 11. In this way it would be possible to achieve higher flight speeds.

Usage Concepts

A first, non-exclusive application would be some kind of improved hang glider. In contrast to paragliders and kites, however, a much more agile and precise movement in the air would be possible. For example, an aerodynamic stall on a wing can be ended by flapping the wing. Depending on the performance of the energy storage systems carried, it is also possible to gain height by flapping the wings. A vertical take-off with the wings is possible with the appropriate construction and energy source.

Because the wings are foldable, it is possible to fly in contorted places and pass narrow spaces with the wings pulled up. In sum, a flight system according to the present invention is superior to that of other aircraft with regard to free mobility in the air.

In the preferred embodiment, the pilot is connected to the wing system and flies with it. Another possibility is to establish the connection between the input method and the wing system by radio. In this way, a telepresence or telerobotics system is formed, which has larger free transport capacities. The pilot could, for example, float with his exoskeleton in a harness, while the wing system acts like a drone at a remote location. It is possible that such a wing system can also be controlled solely with the aid of alternative input methods or flight patterns.

I claim:

1. A flight system comprising:
   at least two actuated flapping wings;
   an actuated tail unit;
   a control device; and
   an exoskeleton for at least one person, the exoskeleton being movable independently of the flapping wings, and
   wherein the control device is configured to
      receive motion sensor signals from the exoskeleton,
      use the motion sensor signals to define specified movement signals, and
      control the flapping wings and/or the tail unit by way of the specified movement signals,
   wherein the specified movement signals are defined such that the movements of the flapping wings and/or of the tail unit follow those of the exoskeleton,
   wherein
      ratios of controller input variables received on the exoskeleton, the flapping wings, the tail unit and subsystems can be set to resulting controller output variables,
      the controller input variables and controller output variable can also be completely decoupled, and
      one or more measured variables are combined to form a manipulated variable.

2. The flight system according to claim 1, wherein the control device is configured to
   receive action sensor signals from the flapping wings and/or the tail unit,
   define feedback specification signals based on the action sensor signals, and
   control the exoskeleton with the feedback specification signals in such a way that the forces acting on the flapping wings and/or the tail unit can be felt by the pilot via the exoskeleton.

3. The flight system according to claim 2, wherein the control device is configured to automatically define specified movements for the flapping wings and/or tail unit based on a direction of movement or a predetermined movement pattern specified for the flight system.

4. The flight system according to claim 1, wherein the control device is configured to define the specified movement signals such that degrees of freedom of the flapping wings can be controlled with the person's arms and/or hands, and/or that degrees of freedom of the tail unit can be controlled with the person's legs and/or feet.

5. The flight system according to claim 4, wherein the control device is configured to automatically define specified movements for the flapping wings and/or tail unit based on a direction of movement or a predetermined movement pattern specified for the flight system.

6. The flight system according to claim 1, wherein the flapping wings each have at least one airfoil and one or more primaries, at least one of said primaries being pivotable perpendicular to an airfoil adjacent to an at least one or more secondaries.

7. The flight system according to claim 6, wherein the control device is configured to automatically define specified movements for the flapping wings and/or tail unit based on a direction of movement or a predetermined movement pattern specified for the flight system.

8. The flight system according to claim 1, wherein the control device is configured to automatically define specified movements for the flapping wings and/or tail unit based on a direction of movement or a predetermined movement pattern specified for the flight system.

9. The flight system according to claim 1, wherein the control device is configured to further receive control signals to specify movements of the flapping wings and/or tail unit, wherein the control signals are produced by devices that comprise analog sticks, switches and buttons and/or a brain-computer interface.

10. The flight system according to claim 1, further comprising an interface for a head-up display (HUD) or a head-mounted display (HMD) to provide the person with information relevant to the operation of the flight system.

11. The flight system according to claim 1, further comprising one or more objects attached to the wing surface, which objects stand up in the boundary layer in the event of a backflow and impede the flow.

12. The flight system according to claim 1, further comprising gyroscopes operable to generate moments for influencing and/or measuring a flight attitude of the flight system.

13. The flight system according to claim 1, further comprising preloaded energy storage systems configured to put the system in an emergency configuration in the event of failure of subsystems, which emergency configuration limits the rate of descent.

14. The flight system according to claim 1, further comprising at least one additional drive system.

15. The flight system of claim 14, in which the at least one additional drive system comprises a propeller with a drive unit.

16. The flights system of claim 14, in which the at least one additional drive system comprises a jet engine.

17. The flight system according to claim 1, wherein the flapping wings have a plurality of mutually movable and actuated wing members, and wherein stretchable material and/or overlapping spatial surfaces are provided at one or more boundaries between wing members and/or between a wing member and a device carrier.

18. The flight system according to claim 1, wherein the tail unit has tail feathers which are arranged in a fan-like manner, a tilting of the tail feathers perpendicular to a horizontal plane of the flight system being controllable through the mean angle of ankle joints and/or knee joints of the person, and a rotation of the tail feathers about a longitudinal axis of the flight system being controllable by an angle difference between ankle joints and/or knee joints of the person.

* * * * *